E. R. & H. S. Cole.

Fire Engine.

No. 3,342. Reissued Mar. 30, 1869

Witnesses;
Edmund Masson
R. L. Ross Jr.

Inventors;
Edward R. Cole
Henry S. Cole
Per Wm. C. Wood Atty

N. PETERS, PHOTO-LITHOGRAPHER, WASHINGTON, D. C.

UNITED STATES PATENT OFFICE.

EDWARD R. COLE AND HENRY S. COLE, OF PAWTUCKET, RHODE ISLAND.

IMPROVEMENT IN STEAM FIRE-ENGINES.

Specification forming part of Letters Patent No. 79,730, dated July 7, 1868; Reissue No. 3,342, dated March 30, 1869.

*To all whom it may concern:*

Be it known that we, EDWARD R. COLE and HENRY S. COLE, of Pawtucket, county of Providence, and State of Rhode Island, have invented certain new and valuable Improvements in Steam Fire-Engines, of which the following is a specification.

Said improvements consist in the construction of the pump and in the arrangement of its auxiliary parts, making the whole peculiarly adapted for steam fire-engines. We assert that the perpendicularly-acting pump is the most desirable for such purposes, and cite as the chief reason therefor the fact that while in action there is less motion to the engine than is the case with engines using other forms of pump.

The advantages of overcoming useless motion in such an apparatus are obvious. The chafing wear of hose and suction is avoided, the rack and strain upon wheels, axles, springs, and other auxiliary parts are greatly lessened, and consequently the engine is susceptible of longer service without replacement or repairs. To this may be added the advantage of maintaining within the cylinder an equal and easily-compensated wear by friction upon the piston or plunger and rod.

To more perfectly overcome useless motion in the apparatus, to avoid complication, to lessen expense of manufacture, to strengthen parts by new combination, to assist the working of the engine by natural principles, and to overcome the fault in steam fire-engines known as "pounding," our invention is intended and, in practical effect, accomplishes.

To enable persons skilled in the art to make and use our invention, we will proceed to give, with the assistance of the drawings, a full, clear, and exact description thereof.

Figure 1:
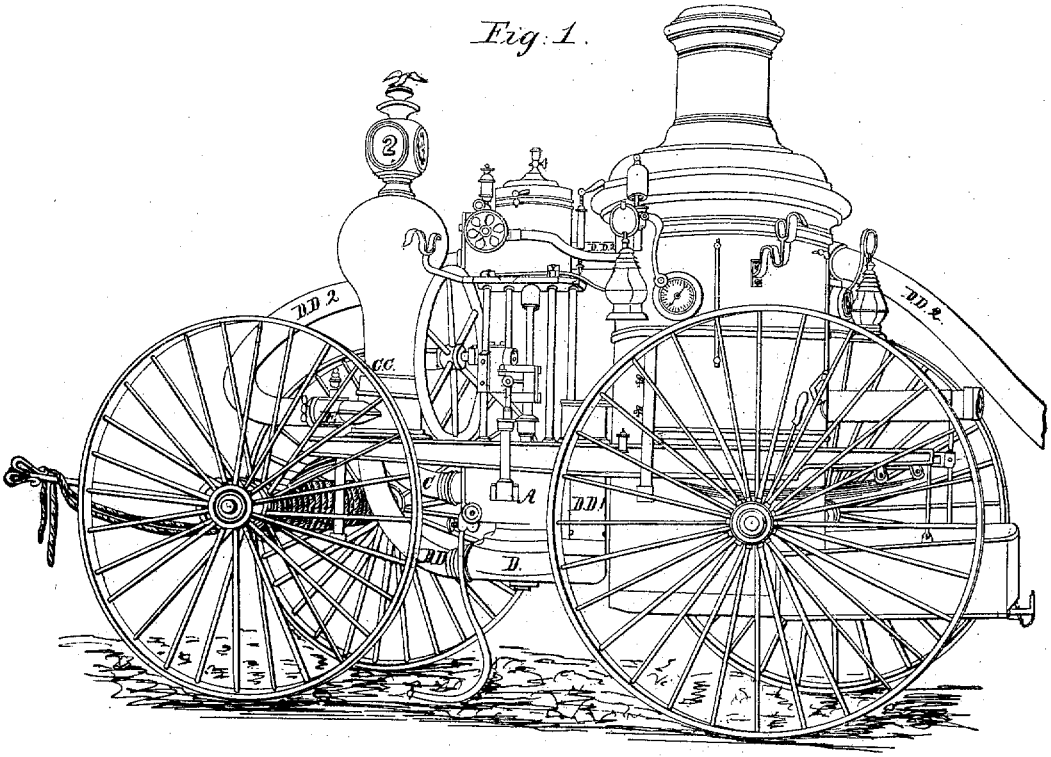
Figure 2:
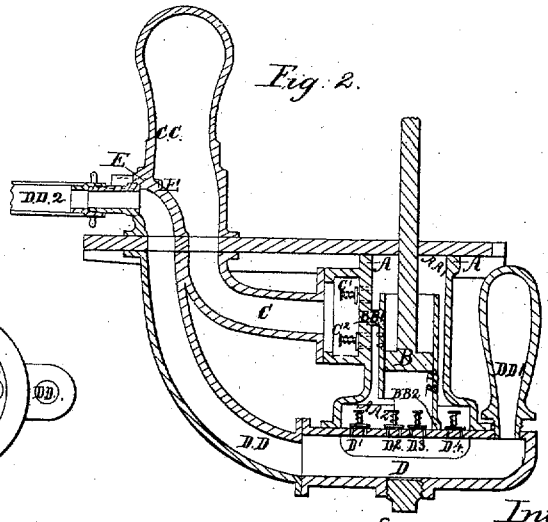

Figure 1 represents a steam fire-engine complete containing our improvements, marked with distinctive letters corresponding with Fig. 2. Fig. 2 represents a section of our pump and auxiliary parts, showing wherein our improvements and invention rest.

A represents a cylinder, the interior of which is at once a suction and a compressing chamber.

B represents the piston and rod.

B B represents a cylinder within the cylinder A, in which the piston B moves up and down. It will be seen, at points marked B B′ and B $B^2$, that there are solid connections between cylinders B B and inner walls of cylinder A. The piston B, in fact, forms a movable partition between the top, bottom, and one side of the interior of cylinder A and the bottom and opposite side of the same. The upper portion of the interior is marked A A′, the lower A $A^2$. Without the presence of the plunger or piston B these chambers would be in one.

D D represents the suction or supply pipe, and is, with the pipe C, constructed in one piece. This pipe leads from the base of the air-chamber, a point considerably above the whole pump, and terminates at the supply-chamber D.

C represents the eduction-pipe to air-chamber C C, into which forced water passes from either part of the pump A A′ or A $A^2$ through the spring-valves shown near the partition B B′, and marked C′ and $C^2$.

D represents the supply-chamber, from which water is drawn to supply either chamber above through spring-valves D′ $D^2$ $D^3$, &c.

D D′ represents a vacuum-chamber for maintaining in a measure a uniform suction at change of stroke.

E represents the point at which forced water is delivered to the hose.

Figure 3:
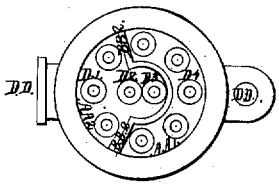

Fig. 3 represents the bottom of the pump, and shows the spring-valves and dividing-partition B $B^2$.

The operation of the pump is as follows: The piston being raised, water is thereby drawn from the supply-chamber D into the inner and lower chamber, A $A^2$, through the spring-valves D′ $D^2$ $D^3$, &c. The piston being depressed, the water then in chamber A $A^2$ is forced, through spring-valve $C^2$, into eduction-pipe C, air-chamber C C, thence to hose. The upper chamber, A A′, is filled by the downward suction of piston B, by water through valves $D^4$, &c., and, by the succeeding upward movement, the water so drawn is forced through spring-valve C′, and so on.

Referring to our previous enumeration of advantages gained by us through our improvements, we will now consider each in turn.

We more perfectly overcome useless motion by the arch and weight of the suction-pipe D $D^2$ and the column of water within. This is utilized by our peculiar arrangement, and is shown in Fig. 1.

We avoid complication, and thereby lessen the expense of manufacturing by the obviously simple arrangement of parts and by the casting in one piece of the cylinder A and the interior cylinder, B B, and also by casting in one piece the pipes C and D D, as shown in Figs. 1 and 2, between the air-chamber C C and the pump.

We strengthen the pump and auxiliary parts by the unity of pipes C and D D, as by their form and position they are, in effect, a perfect truss and brace, greatly adding to the solidity and firmness of the pump.

We assist the pump by natural forces by elevating our suction-pipe above the pump, and continued, as shown in Fig. 1, thus forming a siphon, in effect, to no inconsiderable extent, which tends to lessen the drafting labor of the pump.

We obviate practically the fault of "pounding" by the elevation of the suction-pipe above the pump to such a degree that the pump, after being started, is thereby constantly or continually charged, and the power applied is exhausted by direct action upon the water instead of upon a vacuum, as in the case of a "pounding" pump.

Having thus described our invention, we claim as new and desire to secure by Letters Patent—

1. The pump-cylinder A, constructed substantially as described, forming the chambers A A′ and A $A^2$ by the interposition of plunger B.

2. The descending induction-pipe D D, as arranged in relation to the suction-pipe D $D^2$ and to the supply-chamber D, all substantially as shown and described, for the purposes specified.

3. The elevated induction-pipe D D, connected with the eduction-pipe C, arranged substantially as described, for the purposes specified.

4. The arrangement of the siphon-formed induction-pipe D $D^2$ in relation to the air-chamber C C, water-way or elevated induction-pipe D D, and operative parts A B and A $A^2$ and B B.

EDWARD R. COLE.
HENRY S. COLE.

Witnesses:
ROYAL LEE,
GEO. A. CARPENTER.